US012278428B2

(12) United States Patent
Lim et al.

(10) Patent No.: US 12,278,428 B2
(45) **Date of Patent: *Apr. 15, 2025**

(54) LOW ELEVATION SIDELOBE ANTENNA WITH FAN-SHAPED BEAM

(71) Applicant: Waymo LLC, Mountain View, CA (US)

(72) Inventors: Edwin Lim, Cupertino, CA (US); Timothy Campbell, Venice, CA (US); Matthew Markel, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,929

(22) Filed: Apr. 27, 2023

(65) Prior Publication Data

US 2023/0261389 A1 Aug. 17, 2023

Related U.S. Application Data

(63) Continuation of application No. 17/136,393, filed on Dec. 29, 2020, now Pat. No. 11,670,864.

(51) Int. Cl.
*H01Q 19/13* (2006.01)
*H01Q 1/32* (2006.01)
*H01Q 13/02* (2006.01)

(52) U.S. Cl.
CPC ......... *H01Q 19/138* (2013.01); *H01Q 1/3233* (2013.01); *H01Q 1/3275* (2013.01); *H01Q 13/02* (2013.01)

(58) Field of Classification Search
CPC ...... H01Q 1/32; H01Q 1/3208; H01Q 1/3233; H01Q 1/325; H01Q 1/3275; H01Q 1/3283;

(Continued)

(56) References Cited

U.S. PATENT DOCUMENTS

| | | | |
|---|---|---|---|
| 3,414,904 | A | 12/1968 | Ajoika |
| 4,051,476 | A | 9/1977 | Archer |

(Continued)

FOREIGN PATENT DOCUMENTS

| | | | | |
|---|---|---|---|---|
| CN | 103441335 A | * 12/2013 | | |
| CN | 107394406 A | 11/2017 | | |
| CN | 107404000 A | * 11/2017 | ............ | H01Q 13/02 |

*Primary Examiner* — Dameon E Levi
*Assistant Examiner* — Leah Rosenberg
(74) *Attorney, Agent, or Firm* — McDonnell Boehnen Hulbert & Berghoff LLP

(57) ABSTRACT

Example embodiments relate to low elevation side lobe antennas with fan-shaped beams. An example radar unit may include a radiating plate having a first side and a second side with an illuminator, a waveguide horn, a waveguide opening, and a radiating sleeve extending into the first side of the radiating plate. The waveguide opening is positioned on the first end of the first side and the radiating sleeve is positioned on the second end of the first side. The radar unit also includes a metallic cover coupled to the first side of the radiating plate such that the metallic cover and the radiating plate form waveguide structures. The waveguide horn is configured to receive, from an external source, electromagnetic energy provided through the waveguide opening via a first waveguide and provide a portion of the electromagnetic energy to the illuminator via a second waveguide such that the portion of the electromagnetic energy radiates off the illuminator and through the radiating sleeve into an environment of the radar unit as one or more radar signals.

20 Claims, 11 Drawing Sheets

(58) Field of Classification Search
CPC .... H01Q 1/3291; H01Q 13/02; H01Q 13/025; H01Q 13/0258; H01Q 19/138
See application file for complete search history.

(56) References Cited

U.S. PATENT DOCUMENTS

| | | | | |
|---|---|---|---|---|
| 4,349,827 | A | 9/1982 | Bixler | |
| 5,579,021 | A * | 11/1996 | Lee | H01Q 19/13 343/781 R |
| 6,639,566 | B2 | 10/2003 | Knop | |
| 7,280,081 | B2 | 10/2007 | Mahr | |
| 7,872,610 | B2 | 1/2011 | Motzer | |
| 8,878,743 | B1 | 11/2014 | Buchanan | |
| 9,019,164 | B2 | 4/2015 | Brandau | |
| 2006/0049980 | A1 * | 3/2006 | Archer | H01Q 3/18 342/179 |
| 2007/0212008 | A1 | 9/2007 | Schoebel | |
| 2010/0060546 | A1 | 3/2010 | Robson | |
| 2013/0099989 | A1 | 4/2013 | Pantea | |
| 2014/0354499 | A1 | 12/2014 | Legay | |
| 2015/0330826 | A1 | 11/2015 | Kienzle | |
| 2018/0301816 | A1 * | 10/2018 | Kamo | H01P 5/12 |
| 2018/0375219 | A1 | 12/2018 | Kirino | |

* cited by examiner

LOW ELEVATION SIDELOBE ANTENNA WITH FAN-SHAPED BEAM

CROSS REFERENCE TO RELATED APPLICATION

The present application is a continuation of U.S. patent application Ser. No. 17/136,393, filed on Dec. 29, 2020, the entire contents is hereby incorporated by reference.

BACKGROUND

Radio detection and ranging systems ("radar systems") are used to estimate distances to environmental features by emitting radio signals and detecting returning reflected signals. Distances to radio-reflective features in the environment can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information can allow for the surrounding environment features to be determined.

SUMMARY

Example embodiments describe antennas configured to operate using fan-shaped beams with low elevation sidelobes. A vehicle radar system may use one or more radar units configured with such antennas to measure aspects of the nearby environment to supplement navigation of a vehicle.

In one aspect, a radar unit is provided. The radar unit includes a radiating plate having a first side and a second side. The radiating plate includes an illuminator, a waveguide horn, a waveguide opening, and a radiating sleeve that extends into the first side of the radiating plate. The waveguide opening is positioned on a first end of the first side and the radiating sleeve is positioned on a second end of the first side. The radar unit also includes a metallic cover coupled to the first side of the radiating plate such that the metallic cover and the radiating plate form a plurality of waveguide structures. The waveguide horn is configured to receive, from an external source, electromagnetic energy provided through the waveguide opening via a first waveguide, and provide a portion of the electromagnetic energy to the illuminator via a second waveguide such that the portion of the electromagnetic energy radiates off the illuminator and through the radiating sleeve into an environment of the radar unit as one or more radar signals.

In another aspect, a vehicle radar system is provided. The vehicle radar system includes a plurality of radar units coupled to a vehicle and configured to use radar signals to measure an environment of the vehicle. At least one radar unit from the plurality of radar units comprises a radiating plate having a first side and a second side. The radiating plate includes an illuminator, a waveguide horn, a waveguide opening, and a radiating sleeve that extend into the first side of the radiating plate. The waveguide opening is positioned on a first end of the first side and the radiating sleeve is positioned on a second end of the first side. The at least one radar unit also includes a metallic cover coupled to the first side of the radiating plate such that the metallic cover and the radiating plate form a plurality of waveguide structures. The waveguide horn is configured to receive, from an external source, electromagnetic energy provided through the waveguide opening via a first waveguide, and provide a portion of the electromagnetic energy to the illuminator via a second waveguide such that the portion of the electromagnetic energy radiates off the illuminator and through the radiating sleeve into the environment as one or more radar signals.

In yet another aspect, a method of operating a radar unit is provided. The method involves transmitting, using a radar unit, a plurality of radar signals into an environment. The radar unit includes a radiating plate having a first side and a second side. The radiating plate includes an illuminator, a waveguide horn, a waveguide opening, and a radiating sleeve that extends into the first side of the radiating plate. The waveguide opening is positioned on a first end of the first side and the radiating sleeve is positioned on a second end of the first side. The radar unit also includes a metallic cover coupled to the first side of the radiating plate such that the metallic cover and the radiating plate form a plurality of waveguide structures. The waveguide horn is configured to: (i) receive, from an external source, electromagnetic energy provided through the waveguide opening via a first waveguide, and (ii) provide a portion of the electromagnetic energy to the illuminator via a second waveguide such that the portion of the electromagnetic energy radiates off the illuminator and through the radiating sleeve into the environment as the plurality of radar signals. The method further involves receiving, using the radar unit, reflections corresponding to the plurality of radar signals from the environment of the vehicle. Processing the reflections to detect one or more objects in the environment.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
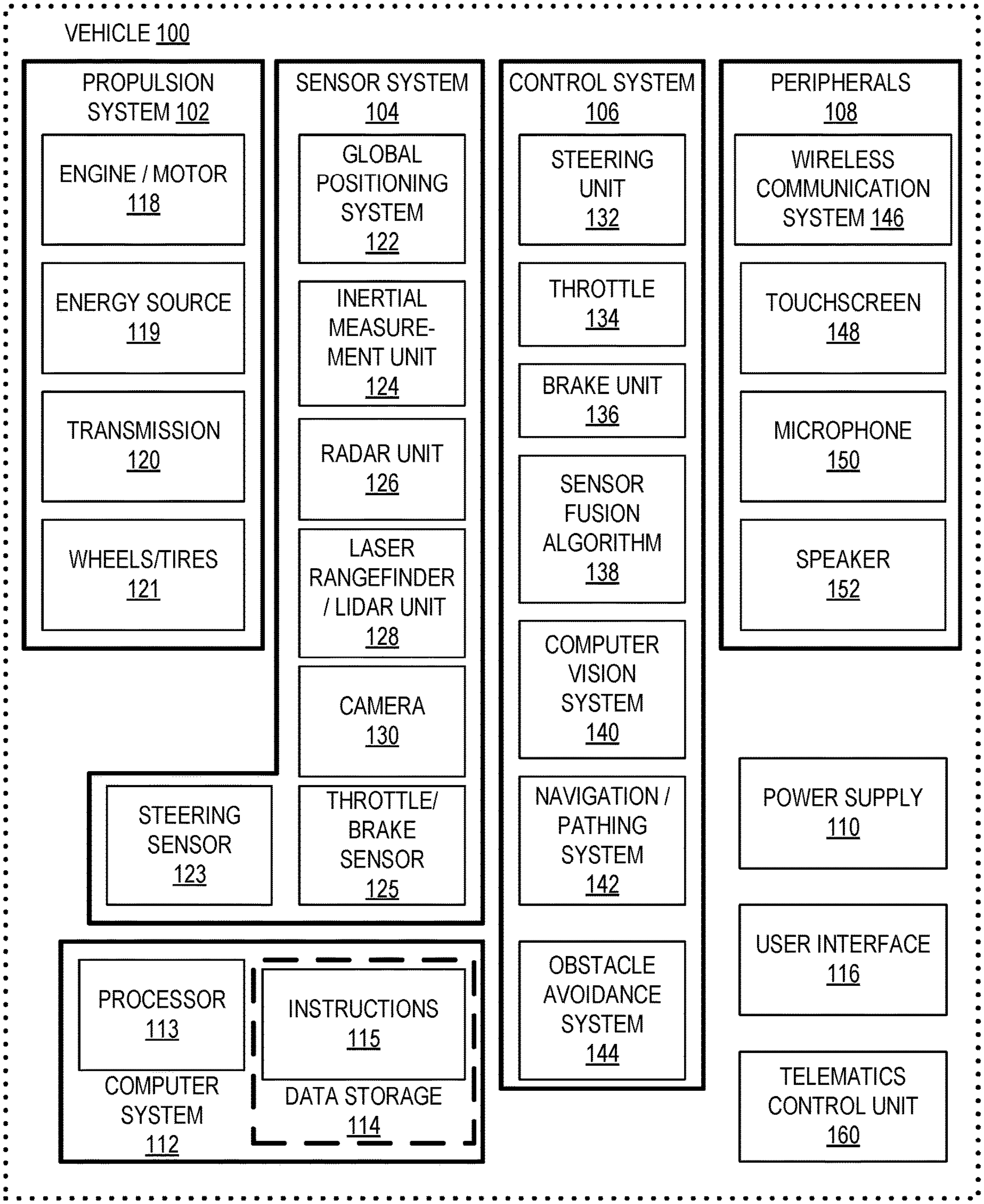
FIG. 1 is a functional block diagram illustrating a vehicle, according to one or more example embodiments.
Figure 2A:
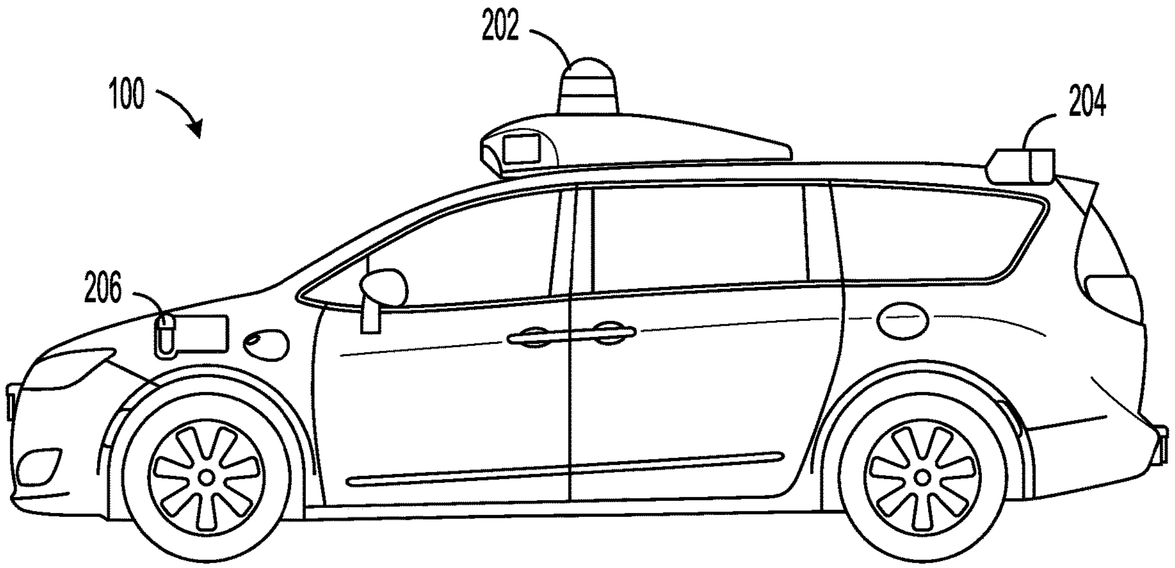
FIG. 2A illustrates a side view of a vehicle, according to one or more example embodiments.
Figure 2B:
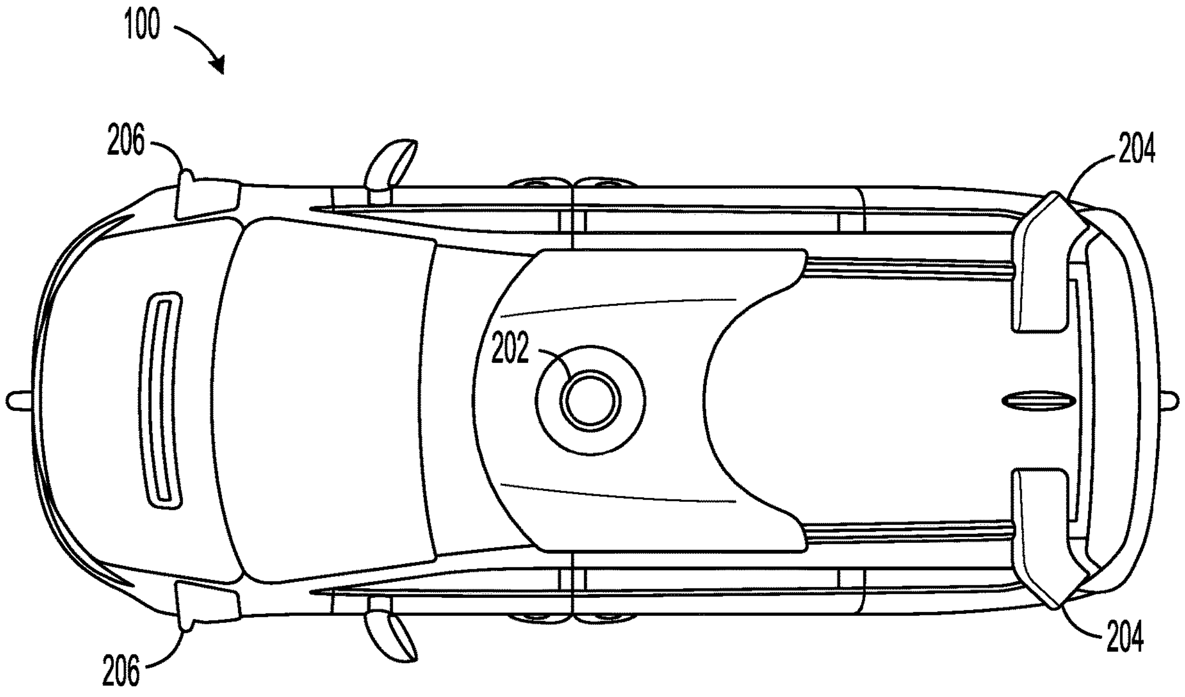
FIG. 2B illustrates a top view of a vehicle, according to one or more example embodiments.
Figure 2C:
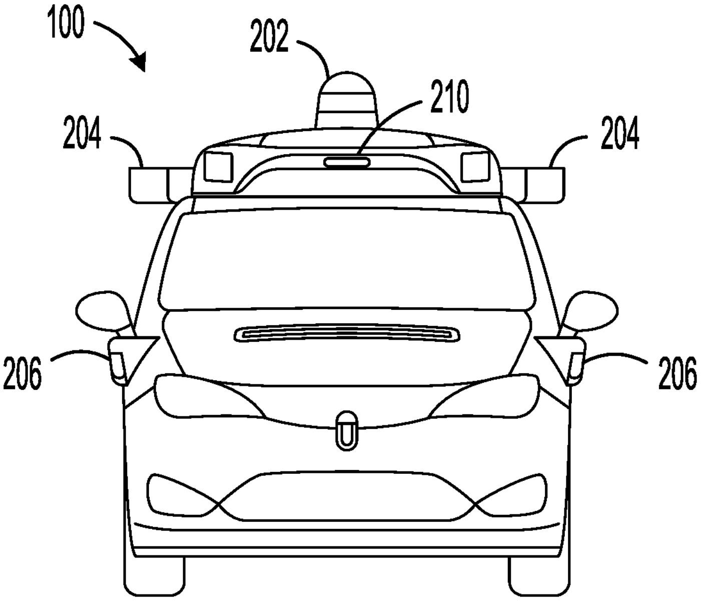
FIG. 2C illustrates a front view of a vehicle, according to one or more example embodiments.
Figure 2D:
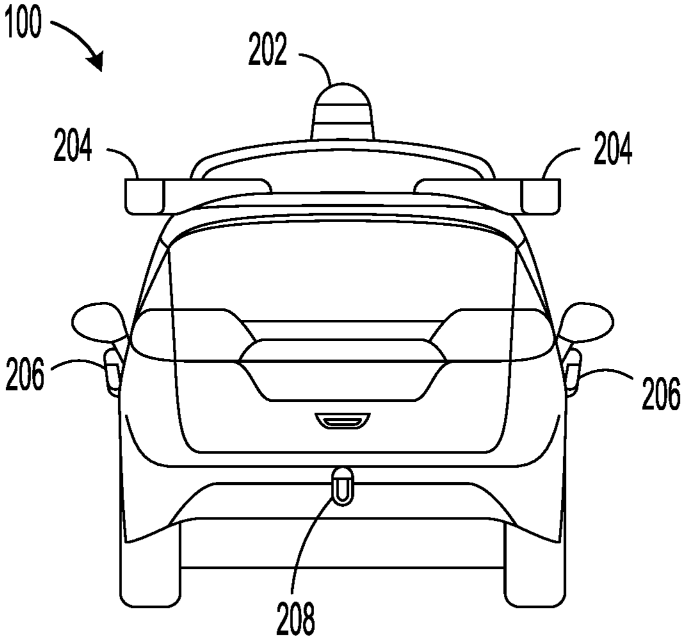
FIG. 2D illustrates a back view of a vehicle, according to one or more example embodiments.
Figure 2E:
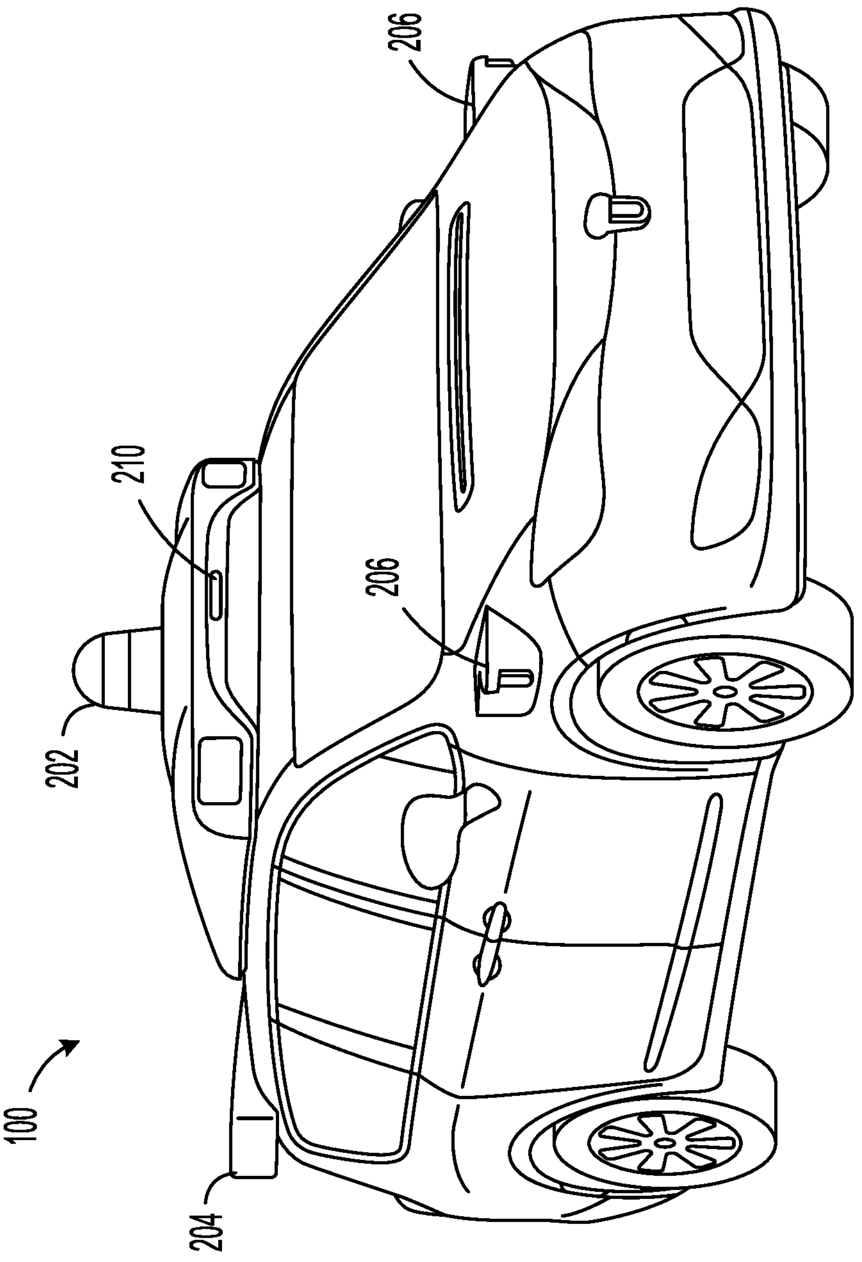
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system can use one or more antennas (radiating elements) to emit electromagnetic energy as radar signals into an environment in order to measure aspects of the environment. Upon coming into contact with surfaces in the environment, the radar signals can scatter in multiple directions with some of the radar signals penetrating into some surfaces while other radar signals reflect off surfaces and travel back towards one or more reception antennas of the radar system as radar reflections. A radar processing system (or another processing unit) may process these radar reflections to generate two dimensional (2D) and/or three dimensional (3D) measurements that represent aspects of the environment, such as the positions, orientations, and movements of nearby objects and other surfaces occupying the environment near the radar system.

Because a radar system can be used to further measure and understand the nearby environment, vehicles are increasingly incorporating vehicle radar systems to generate measurements during navigation that can assist with vehicle navigation, obstacle avoidance, and in other ways that can boost overall vehicle safety. For instance, a vehicle may use radar to detect and identify the positions, orientations, and/or movements of nearby vehicles, bicycles, pedestrians, animals, and stationary objects. Radar can also reveal information about other features in the vehicle's surrounding environment, such as the location, arrangement, and position of road boundaries, road conditions (e.g., smooth or bumpy surfaces), weather conditions (e.g., wet or snowy roadways), and the position of traffic signs and signals.

In some applications, a vehicle radar system is used to assist a driver controlling the vehicle. For instance, radar measurements may be used to generate alerts for certain situations, such as when the vehicle drifts outside its lane, when the vehicle travels too closely to another vehicle or object, and/or in other ways that can help the driver. Radar can also be used to help enable autonomous or semi-autonomous operations by the vehicle. Particularly, radar can be used along with other sensor measurements to help an autonomous vehicle understand its environment and detect changes in the environment in near real-time as discussed above.

As such, the increased use of vehicle radar systems have motivated the exploration of antenna designs that can yield high performance at low manufacturing costs. Many antenna designs often utilize a beam forming network (BFN) configuration to achieve desired results. BFNs can enable signals from multiple radiating antennas to be combined into a pattern that can be more directional than each antenna by itself. To enable the combination, a BFN may include numerous waveguides and junctions that connect the antennas to a printed circuit board (PCB) or another source configured to supply signals for subsequent transmission into the environment by the antennas.

Although these antenna designs that include BFNs can increase directionality of the antennas, the reliance on BFNs can also increase the complexity and cost associated with manufacturing the antennas. Thus, there is a desire for low cost vehicle radar units that are able to emit radiation patterns that maximize the main beam direction while minimizing undesired sidelobe emissions without the complexity that often arises when the radar unit's design includes a BFN. Such radiation patterns may enable a vehicle radar system to obtain accurate measurements of nearby vehicles and other surfaces in a vehicle's environment during navigation.

Example embodiments presented herein describe antennas that meet the above criteria by being low cost to produce and able to emit radiation patterns with fan-shaped beams and low elevation sidelobes. Some example antennas can be configured to produce a razor-thin fan-shaped beam that radiates plus/minus 45 degrees on the azimuth plane and plus/minus 0.6 degrees on the elevation plane. The radiation pattern may differ in other example embodiments. By reducing the complexity of the antenna design, example antennas presented herein may offer high performing radar directionality at a manufacturing cost that is less than other antenna designs that rely on an intricate BFN to enhance directionality.

To further illustrate, an example antenna may include a radiating plate with an illuminator, a waveguide horn, a waveguide opening, and a radiating sleeve that each extend into one side of the radiating plate. In particular, these elements (e.g., the illuminator) may be etched into a rectangular plate serving as the radiating plate for the antenna. The waveguide opening and the radiating sleeve may be positioned on opposite ends of the radiating plate. In other embodiments, the waveguide opening can have another position relative to the radiating plate on the radiating plate. For instance, the waveguide opening can be a through-hole positioned in an inner portion of the radiating plate.

In order to enable the transmission and/or reception electromagnetic energy by the elements formed (e.g., etched) into the side of the radiating element, the antenna also includes a metallic cover configured to couple to the side of the radiating plate with the elements. The metallic cover may be a flat metallic surface that can enclose the different elements etched into the side of the radiating plate. In particular, when coupled to the radiating plate, the surface of the metallic cover and the radiating plate create an assembly that forms waveguides coupling the different elements on the radiating plate together, which enables the antenna to transmit signals into the environment and/or receive reflections from the environment. These waveguides formed by the assembly between the metallic cover and the radiating plate define the channels that enclose and guide electromagnetic energy between elements of the antenna.

This configuration of the antenna formed by the assembly can enable transmission of a radiation pattern that includes low sidelobes and fan-shaped beams. The radiation pattern increases the directionality of the antenna and helps limit noise that can arise from signal sidelobes. In some embodiments, the antenna may be implemented as a radar unit configured to transmit radar signals with high directionality, which may produce accurate measurements of the nearby environment.

Transmission of signals using the example antenna may involve feeding electromagnetic energy into the antenna via the waveguide opening. For instance, a printed circuit board (PCB) or another type of source may supply signals into the antenna via the waveguide opening. The electromagnetic energy may traverse through a first waveguide extending from the waveguide opening to the waveguide horn, which is configured to direct at least a portion of the electromagnetic energy toward the illuminator. The length of the waveguide and the positioning of the waveguide opening relative to the waveguide horn can differ within examples. The illuminator and the waveguide horn may be coupled together via another waveguide that enables electromagnetic energy to travel between these components. As such, the illuminator may have an arc-shape with a degree of curvature designed to reflect the electromagnetic energy directed by the waveguide horn out into the environment as signals via a radiating sleeve formed between the metallic plate and the radiating plate. The curvature of the illuminator, position between the illuminator relative the waveguide horn, and/or other parameters of the antenna may be designed to enable the antenna to operate with radiation patterns that have fan-shaped beams and low elevation side lobes.

The antenna can also be used to receive electromagnetic energy from the environment. For example, the antenna may operate as a radar unit configured to receive reflections of radar signals that bounced off surfaces in the environment and back toward the radar unit. Radar reflections may enter into the radar unit via the radiating sleeve and reflect off the illuminator toward the waveguide horn via a waveguide. The waveguide horn may receive at least a portion of the radar reflection and guide the radar reflections through a waveguide and out the waveguide opening to an external source (e.g., a PCB). A processing unit may process the radar reflections received via the radar unit to develop information representing the environment nearby the radar unit, such as the positions, movements, and/or orientations of nearby surfaces.

In some embodiments, example antennas are implemented with multiple radiating plates assembled together. Each of these radiating plates (or a subset of the radiating plates) may each include a similar construction as the radiating plate of the example antenna described above. As such, with multiple radiating plates coupled together, the antenna can efficiently transmit and receive signals in additional ways. For example, the antenna can be implemented as a radar unit configured to quickly switch between transmitting radar signals into the environment and receiving radar signal reflections that reflect off surfaces in the environment. In some applications, some radiating plates can be designated for signal transmission while others are designated for signal reception. For instance, a radar unit may include a first set of radiating plates used for signal transmission (e.g., three radiating plates) and a second set of radiating plates used for signal reception (e.g., two radiating plates). As shown, the quantity and arrangement of the radiating plates can vary within embodiments.

Some embodiments further involve using example radar units with antenna designs described herein as part of a vehicle radar system. In particular, a vehicle radar system may include one or more of radar units with antenna designs presented herein to obtain accurate measurements of the environment surrounding a vehicle. These radar units can be coupled to the vehicle at various locations and orientations that enable the vehicle radar system to measure the changing environment of the vehicle to assist with vehicle navigation. As such, the use of these radar unit designs can enable the vehicle radar system to use radiation patterns with low sidelobes to accurately measure aspects of the environment, such as the positions, orientations, and/or movements of nearby vehicles, pedestrians, traffic signs, road boundaries. For example, the vehicle radar system may include multiple radar units coupled at different positions and/or orientations on the vehicle to enable each radar unit to measure a different region of the environment surrounding the vehicle (e.g., a quadrant configuration configured to measure approximately 360 degrees around the vehicle).

Some example radar units may be configured to operate at an electromagnetic wave frequency in the W-Band (e.g., 77 Gigahertz (GHz)). The W-Band may correspond to electromagnetic waves on the order of millimeters (e.g., 1 mm or 4 mm). A radar system may use one or more antennas that can focus radiated energy into tight beams to measure an environment with high accuracy (e.g., fan-shaped beam with low sidelobes). Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
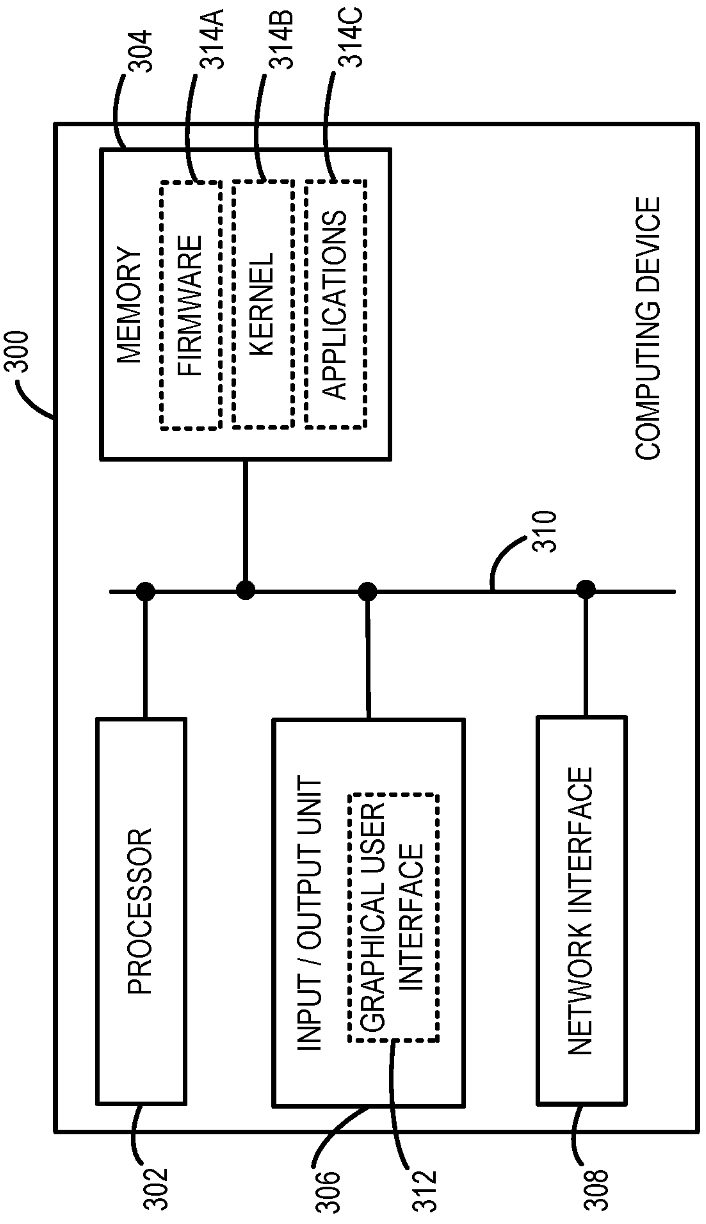
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations.

In addition, computing device 300 may enable the performance of embodiments described herein, including operations related to transmitting and/or receiving signals via antenna architecture. For, computing device 300 may cause an antenna structure to transmit signals (e.g., radar signals) and/or receive signals (e.g., radar reflections) for subsequent processing by computing device 300 and/or another processing system. For example, computing device 300 may perform processing techniques on incoming measurements obtained via radar. The processing techniques may involve using sensor fusion and other analysis techniques to derive information from radar reflections.

Figure 4B:
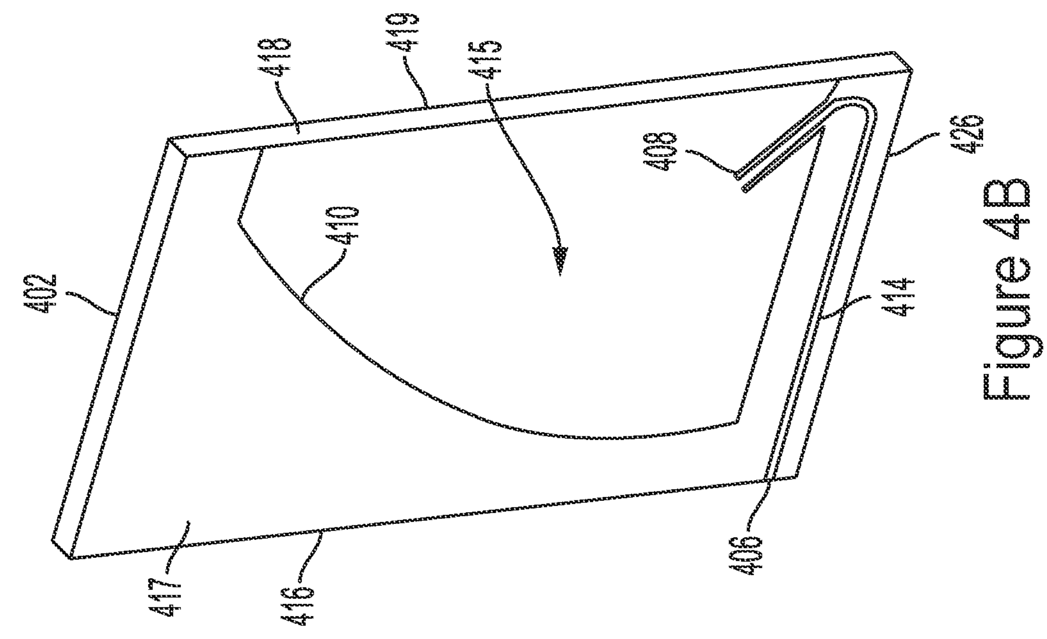
FIG. 4B illustrates the radiating plate of the radar unit assembly, according to one or more example embodiments.
Figure 4A:
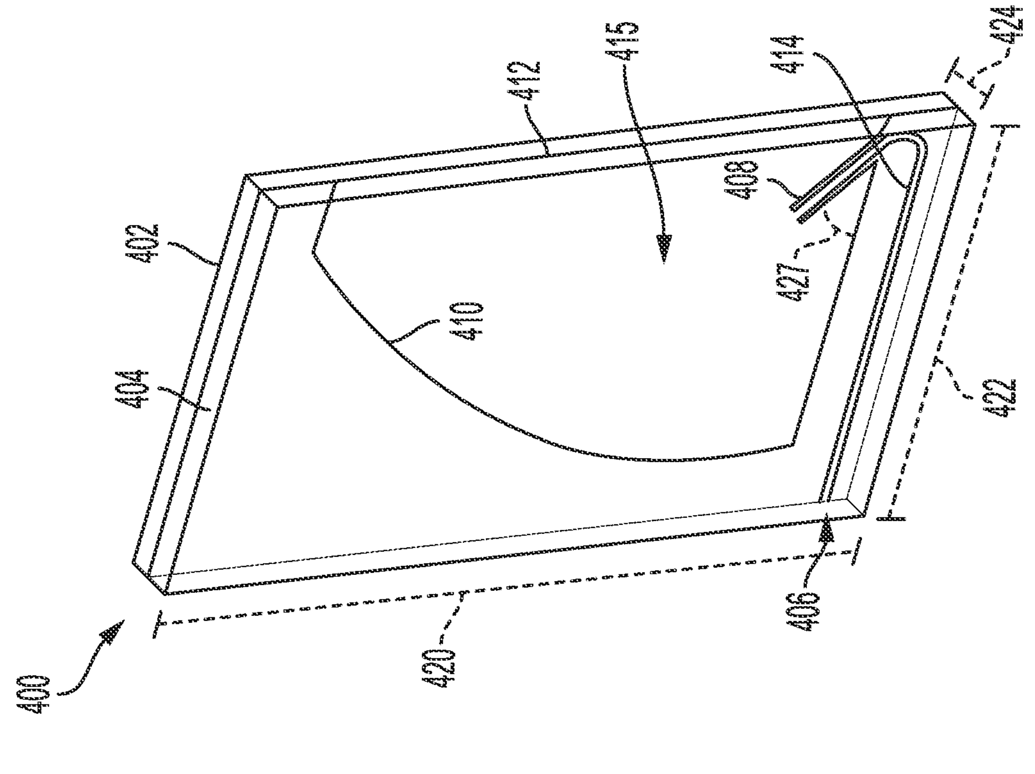
FIG. 4A illustrates a radar unit assembly, according to one or more example embodiments.

FIG. 4A illustrates a radar unit assembly, according to one or more example embodiments. In the example embodiment, radar unit 400 includes radiating plate 402 coupled to metallic cover 404 together to form a structural antenna assembly that enables radar unit 400 to transmit and/or receive signals. Radar unit 400 may be part of a vehicle radar system in some applications. In addition, radiating plate 402 is further shown with waveguide opening 406, waveguide horn 408, illuminator 410, and radiating sleeve 412. In other embodiments, the arrangement, size, and orientation of components for radar unit 400 can differ.

When assembled together, radiating plate 402 and metallic cover 404 form waveguides that enclose and connect the components extending into radiating sleeve 412 together to enable electromagnetic energy to propagate through radar unit 400 and out in the environment as radar signals. These waveguides create boundaries that help direct signals between elements enabling radar unit 400 to operate. For instance, the assembly forms waveguide 414, which couples together waveguide opening 406 and waveguide horn 408. The assembly also forms waveguide 415 that couples waveguide horn 408, illuminator 410, and radiating sleeve 412. Each waveguide can enable electromagnetic energy to traverse between components and in and out of radar unit 400.

In addition to the waveguides, the assembly between radiating plate 402 and metallic cover 404 also forms radiating sleeve 412 that can be used for signal transmission or reception. Radiating sleeve 412 represents an opening in the seam that exists in the side of the assembly at the coupling point between radiating plate 402 and metallic cover 404. The width of radiating sleeve 412 can depend on the depth of the etching of a channel into side 417 proximate end 418. In some embodiments, radiating sleeve 412 can be etched a depth into side 417 that matches one or more of the other elements (e.g., illuminator 410). The height of radiating sleeve 412 may depend on how signals reflect off illuminator 410, height 420 of radiating plate 402, and/or other parameters. As such, radar unit 400 can be configured to transmit signals, such as radar signals with millimeter wavelengths (e.g., 2-4 mm) through radiating sleeve 412.

Radar unit 400 may operate using waveguide opening 406, waveguide horn 408, illuminator 410, and radiating sleeve 412. These elements enable radar unit 400 to propagate electromagnetic energy from a PCB or another source into the environment and from the environment to the PCB or a different component. For signal transmission, electromagnetic energy may initially enter through waveguide opening 406 from an external source (e.g., a PCB) and propagate through waveguide 414 to waveguide horn 408. Waveguide horn 408 may direct the electromagnetic energy (or a portion of the electromagnetic energy) toward one or more curved portions of illuminator 410 via waveguide 415, which enables illuminator 410 to subsequently reflect all or some of the electromagnetic energy through radiating sleeve 412 and out into the environment as signals. For example, the transmitted electromagnetic energy can traverse the environment as radar signals that reflect back toward radar unit 400 or another reception antenna or antennas for subsequent processing to understand the environment.

In addition, radar unit 400 can be used to receive electromagnetic energy from the environment. For example, after radar signals bounce off object surfaces in the environment, some of the radar signals may traverse back toward radar unit 400 as reflections. The reflections may be initially received by radar unit 400 via radiating sleeve 412. In particular, the reflections may enter through radiating sleeve 412 and traverse toward illuminator 410 via waveguide 415. The reflections (or a portion of the reflections) may reflect off illuminator 410 toward waveguide horn 408 via waveguide 415, which may direct the electromagnetic energy of the reflections (or a portion of the electromagnetic energy) into waveguide 414 toward waveguide opening 406. In particular, waveguide 414 may enable the electromagnetic energy to traverse through waveguide opening 406 and to an external source, such as a PCB or another source that enables a processing unit to process the electromagnetic energy to determine information about the environment. For instance, a vehicle radar processing unit may identify range, orientation, and movement parameters corresponding to objects in the environment using consecutive radar measurements obtained from radar unit 400 and/or other radar units.

The size and configuration of radar unit 400 can differ within example embodiments. In the example embodiment shown in FIG. 4A, metallic cover 404 and radiating plate 402 are both rectangular structures having matching height 420 and width 422. The assembly of radiating plate 402 and metallic cover 404 results in length 424, which can also be referred to as depth. Radiating plate 402 and metallic cover 404 can be implemented in various types of materials, such as different metals (e.g., aluminum, copper, zinc, iron), metal alloys, or a combination of materials. For example, radiating plate 402 and/or metallic cover 404 may be constructed in a polymer with surfaces of components coated in metal to enable propagation of electromagnetic energy between components during operation of radar unit 400.

In other embodiments, metallic cover 404 and radiating plate 402 can have different structures, materials, and/or dimensions. Metallic cover 404 can be larger or smaller than radiating plate 402. Similarity, other parameters of metallic cover 404 and radiating plate 402 can differ, such as material used, component thickness, shapes, etc. For instance, metallic cover 404 may have a different length than radiating plate 402. In addition, in the example embodiment shown in FIG. 4A, metallic cover 404 has flat surfaces, which differs from the side of radiating plate 402 that includes the various components that enable signal transmission and reception. Metallic cover 404 may include flat surfaces to keep costs low and enable easy alignment during assembly. In other embodiments, however, metallic cover 404 may include portions of the components extending into the side of metallic cover 404 that engages the surface of radiating plate 402. For instance, metallic cover 404 may include a portion of waveguides 414, 415, as well as portions for other components (e.g., illuminator 410).

In some embodiments, radar unit 400 can be part of a vehicle radar system. As such, radar unit 400 can be coupled to the vehicle at a vertical orientation (as shown in FIG. 4A), a horizontal orientation (e.g., with radiating plate 402 oriented on top of metallic cover 404 or metallic cover 404 on top of radiating plate 402), or a slanted orientation. The orientation may depend on the desired use of radar unit 400. The vehicle radar system may include multiple radar units coupled at different positions on the vehicle. For instance, a vehicle may include radar unit 400 and similar radar units coupled in a quadrant arrangement to measure 360 degrees around the vehicle. Each radar unit may use narrow fan beams that can be combined to determine a 2D or three dimensional (3D) map of the environment surrounding the vehicle. In some instances, a vehicle radar unit may also include other radar unit types in combination with radar unit 400.

FIG. 4B illustrates another view of the radiating plate, according to one or more example embodiments. In the example embodiment, radiating plate 402 includes waveguide opening 406, waveguide horn 408, illuminator 410, waveguide 414, and waveguide 415 as also shown in FIG. 4A. These components may be etched, printed, or otherwise generated into side 417 of radiating plate 402. For instance, one or more of these components (e.g., waveguide horn 408 and illuminator 410) may be recessed approximately 50 millimeters into radiating plate 402. In other embodiments, the arrangement, size, and other parameters of these components as well as radiating plate 402 may differ.

As shown in FIG. 4B, waveguide opening 406, waveguide horn 408, illuminator 410, waveguide 414, and waveguide 415 are formed into side 417 of radiating plate 402. Side 417 of radiating plate 402 is coupled to metallic cover 404 to enable the surface of metallic cover 404 to close and enable components to enclose and propagate electromagnetic energy for signal transmission or reception. In particular, the assembly between radiating plate 402 and metallic cover 404 form waveguide opening 406, waveguide horn 408, illuminator 410, and waveguides 414-415. In addition, the opposite side of radiating plate 402 (i.e., side 419) may be a flat surface without any components similar to metallic cover 404. As such, side 419 of radiating plate 402 can enclose components relative to another radiating plate coupled to side 419 of radiating plate 402 when radar unit 400 includes multiple radiating plates.

Waveguide opening 406 represents a slot that may enable electromagnetic energy to enter into radar unit 400 and exit from radar unit 400 relative to an external source (e.g., a PCB). As shown in FIG. 4B, waveguide opening 406 is positioned on end 416 on side 417 of radiating plate 402, which is opposite of radiating sleeve 412 positioned on end 418 of side 417 when radiating plate 402 is coupled to metallic cover 404. In other embodiments, waveguide opening 406 can have a different position on radiating plate 402. For instance, waveguide opening 406 can extend through side 417 or side 419 into waveguide 414. As such, the orientation and structure of waveguide 414 can differ based on the location and size of waveguide opening 406. In an embodiment, waveguide opening 406 can have a position relative to waveguide horn 408, such as into side 417, into side 419, or up through base 426. For instance, a PCB may couple to base 426 (or relative to base 426) and waveguide opening can be positioned in base 426 between waveguide 414 and waveguide horn 408 and the PCB.

Waveguide horn 408 represents a component that can help direct electromagnetic energy into waveguide 414 during signal reception and out of waveguide 414 during signal transmission. The shape, position, angle 427 relative to waveguide 414, and other parameters of waveguide horn 408 can differ within examples. In some instances, waveguide horn 408 can control the correct power distribution to illuminator 410.

In the embodiment shown, waveguide horn 408 includes a fray opening with the end portion (the mouth) having a greater diameter than the portion that connects to waveguide 414. With this fray opening configuration, waveguide horn 408 can serve as a funnel when receiving electromagnetic energy that is reflected off illuminator 410 after entering into radar unit 400 via radiating sleeve 412. The mouth may enable more electromagnetic energy to be received into waveguide 414 and guided to an external source via waveguide opening 406. For example, a processor may use these received signals to determine information about the environment, such as the position, orientation, size, and motions of nearby objects.

Illuminator 410 represents a component formed in radiating plate 402 that can help reflect electromagnetic energy out into the environment through radiating sleeve 412 when radar unit 400 is being used for signal transmission. In particular, waveguide horn 408 may be oriented at angle 427 relative to waveguide 414 and illuminator 410 to direct electromagnetic energy from waveguide 414 toward illuminator 410, which can subsequently cause some electromagnetic energy to radiate out radiating sleeve 412 as radar signals. The curvature of illuminator 410 and the position and orientation of waveguide horn 408 (e.g., angle 427) as well as other factors can influence the radiation pattern of radar unit 400. As further shown, in some embodiments, the top portion of the illuminator may be a straight segment that extends parallel to waveguide 414.

In the embodiment shown in FIGS. 4A-4B, the arrangement of illuminator 410 and waveguide horn 408 may enable radar unit 400 to transmit fan-shaped narrow beams with low sidelobes. By sizing and shaping illuminator 410, the elevation beam patterns produced by radar unit 400 can be adjusted and the sidelobe levels can be minimized. For example, illuminator 410 can enable radar unit 400 to emit radar signals that have at least plus/minus 45 degrees on the azimuth plane and plus/minus 0.6 degrees on the elevation plane across intended frequencies (e.g., within spectrum between 76 GHz and 81 GHz). In some instances, the elevation sidelobe levels are at least 28 dB or better.

In addition, illuminator 410 can also be used during signal reflection reception by radar unit 400. Particularly, illuminator 410 can redirect signals (e.g., radar reflections) that enter from the environment into radar unit 400 through radiating sleeve 412 into waveguide horn 408. The electromagnetic energy may be redirected through waveguide 415 by illuminator 410 and subsequently funneled into waveguide 414 via waveguide horn 408. The electromagnetic energy can further propagate through waveguide 414 and out from radar unit 400 through waveguide opening 406. An external source (e.g., a processing unit) may process incoming signals to determine information about the environment. As a result, radar unit 400 can achieve results similar to or beyond the results produced by complex beam forming networks that can be difficult to manufacture.

Waveguides 414, 415 can enable electromagnetic energy to propagate between components within radar unit 400. As such, the dimensions of waveguides 414, 415 can differ within examples and can depend on the size of radiating plate 402, position of components (e.g., waveguide horn 408 and illuminator 410), and other potential parameters. In other embodiments, radar unit 400 may include more or less waveguides.

Figure 4C:
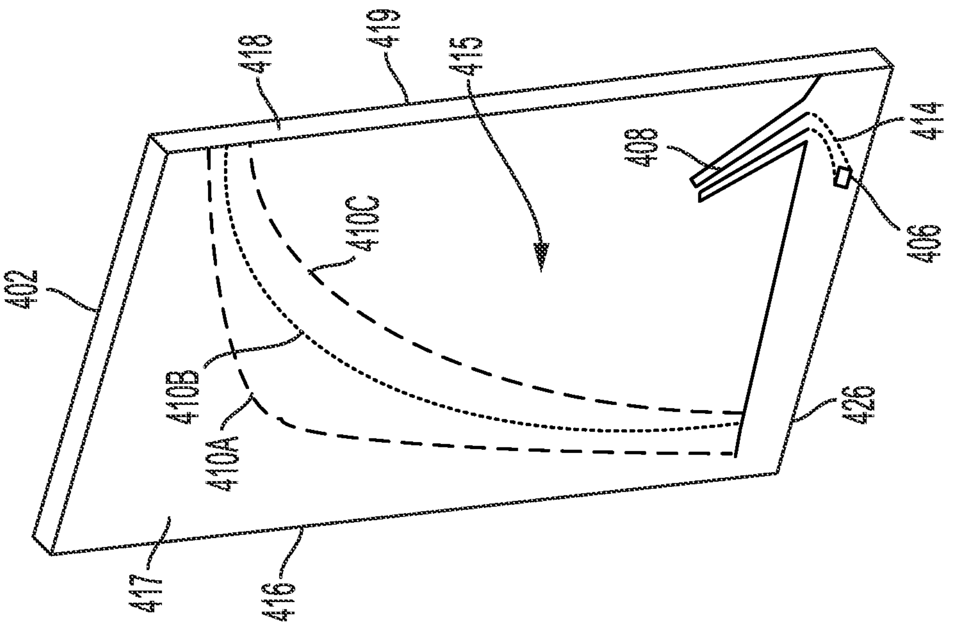
FIG. 4C illustrates another configuration for the radiating plate of the radar unit assembly, according to one or more example embodiments.

FIG. 4C illustrates another configuration for radiating plate 402, which shows radiating plate 402 configured with the elements described for the embodiment illustrated in FIGS. 4A-4B. As shown, the embodiment represents different options (illuminator option 410A, illuminator option 410B, and illuminator option 410C) that may be used to implement illuminator 410 within radar unit 400. These options differ in curvature, size, and positioning relative to waveguide horn 408, which may directly impact the radiation pattern produced by radar unit 400. As such, the selection of parameters for illuminator 410 can depend on the desired radiation pattern for radar unit 400 with slight differences in design influencing signal output.

In addition, waveguide opening 406 has a different position as a through hole extending through radiating plate 402. At this position, a transmission line may couple to waveguide opening 406 on side 419 and/or through a similarly positioned through hole in metallic cover 404. As further shown, waveguide 414 may have a different orientation and position to couple waveguide opening 406 to waveguide horn 408. In addition, waveguide horn 408 can have a different orientation and position relative to illuminator 410 in some embodiments. For instance, waveguide horn 408 may have a more central position in another configuration of radiating plate 402.

Figure 5B:
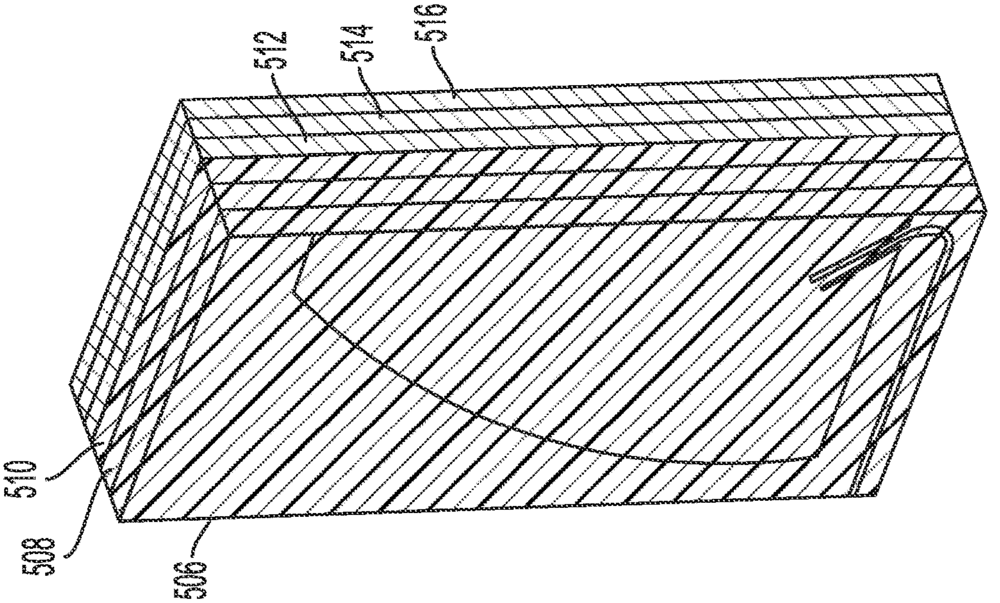
FIG. 5B illustrates another view of the radar unit assembly shown in FIG. 5A, according to one or more example embodiments.
Figure 5A:
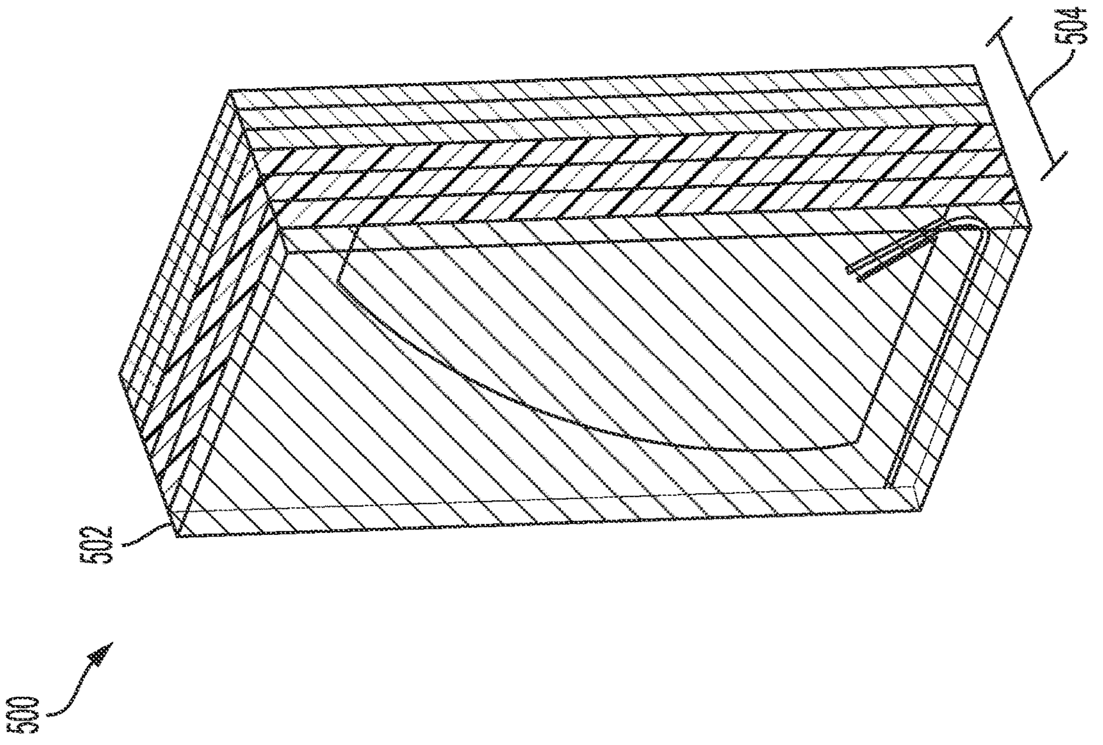
FIG. 5A illustrates a radar unit assembly with multiple radiating plates, according to one or more example embodiments.

FIG. 5A illustrates a radar unit with multiple radiating plates, according to one or more example embodiments. Radar unit 500 includes metallic cover 502 coupled to multiple radiating plates 504. As shown in FIG. 5A, radar unit 500 is similar to radar unit 400, but further includes additional radiating plates coupled together resulting in a total of 6 radiating plates. In other examples, radar unit 500 may have a different quantity of radiating plates.

Metallic cover 502 may be implemented similar to metallic cover 404 associated with radar unit 400. In particular, metallic cover 502 may have a similar rectangular structure as radiating plates 504 and can have a flat surface (i.e., no recess) that can engage a side of a first radiating plate from radiating plates 504. The flat surface of metallic cover 502 can form waveguides to connect components formed into a side of the first radiating plate.

In some embodiments, radiating plates 504 of radar unit 500 may include 3 transmission antennas and 3 reception antennas that are spaced approximately 10-14 mm apart, for example. In other embodiments, radiating plates 504 can include different quantities of transmission antennas, reception antennas, and total radiating plates overall. In addition, the spacing between radiating plates can differ and depend on the thickness of radiating plates used.

FIG. 5B illustrates another view of the radar unit shown in FIG. 5A, according to one or more example embodiments. In particular, the view depicts radiating plates 504 of radar unit 500 without metallic cover 502. In the example embodiment, radiating plates 504 include radiating plate 506, radiating plate 508, radiating plate 510, radiating plate 512, radiating plate 514, and radiating plate 516. In this configuration, radar unit 500 may transmit or receive signals through radiating sleeves positioned between each pair of coupled radiating plates 506-516 as well as between metallic cover 502 and radiating plate 506. In other embodiments, additional metallic covers can be coupled in between and/or relative to radiating plates 506-516.

Radiating plates 506-516 may have the same configuration in some examples. For instance, each radiating plate 506-516 may resemble radiating plate 402 shown in FIG. 4B and/or another configuration such as one of the options illustrated in FIG. 4C. In other examples, the configuration of one or more radiating plates 506-516 may differ. For instance, some radiating plates may resemble radiating plate 402 while other radiating plates are implemented in another configuration. The variation in configuration could enable radar unit 500 to operate using different radiation patterns.

Figure 6:
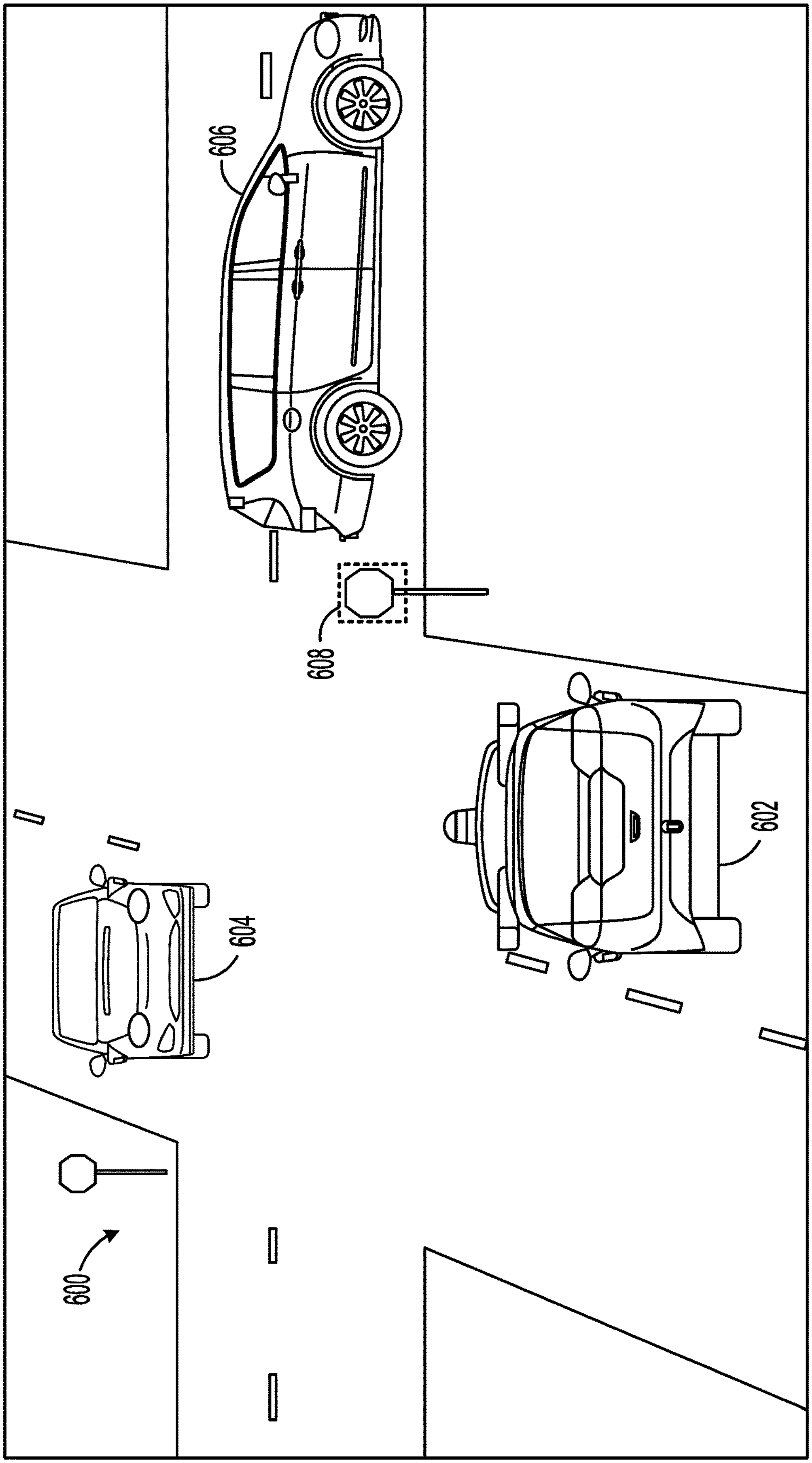
FIG. 6 illustrates a scenario for using vehicle radar to detect objects in the environment, according to one or more example embodiments.

FIG. 6 illustrates a scenario for using vehicle radar to detect objects in the environment, according to one or more example embodiments. Scenario 600 involves vehicle 602 navigating in an environment that is also occupied by vehicle 604 and vehicle 606. During navigation, vehicle 602 may use radar and other sensors to measure aspects of the environment. For instance, the vehicle radar system of vehicle 602 may detect stop sign 608 as well as vehicle 604 and vehicle 606 by transmitting radar signals into the environment and receiving radar reflections that bounce off these objects and back towards one or more radar units for reception. As such, the vehicle radar system of vehicle 602 may include one or more radar units described herein. For instance, the vehicle radar system of vehicle 602 may include one or more radar units implemented as radar unit 400 and/or radar unit 500.

Vehicle 602 may include one or more processing units, which may use radar reflections and/or other sensor data to determine information about the environment, such as the location, orientation, approximate size, and motion of each object relative to vehicle 602. For instance, a processing unit may cause vehicle 602 to perform a navigation strategy that factors the information derived using radar and other sensors.

Figure 7:
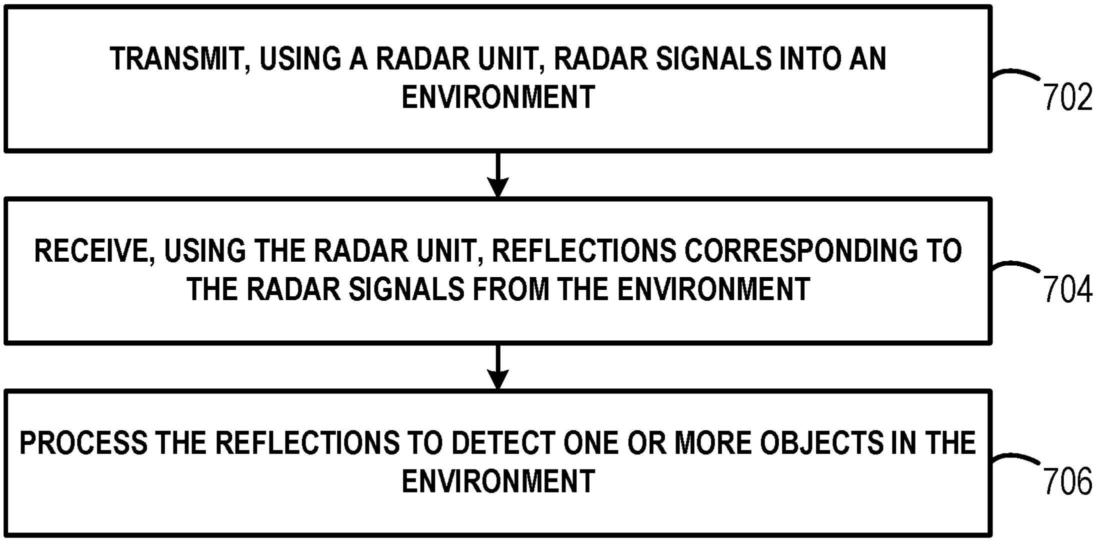
FIG. 7 is a flow chart of a method for operating a radar unit, according to example embodiments.

FIG. 7 is a flowchart of example method 700 for operating a radar system, according to one or more embodiments. Method 700 may include one or more operations, functions, or actions, as depicted by one or more of blocks 702, 704, and 706, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 702, method 700 involves transmitting, using a radar unit, radar signals into an environment. The radar unit may be implemented as radar unit 400 shown in FIG. 4A or radar unit 500 shown in FIG. 5A. The radar unit may be part of a vehicle radar system similar to the example embodiment shown in FIG. 6.

As an example, the radar unit may include a radiating plate having a first side and a second side. For instance, the radiating plate may include an illuminator, a waveguide horn, a waveguide opening, and a radiating sleeve that each extend into the first side of the radiating plate. The waveguide opening may be positioned on the first end of the first side and the radiating sleeve may be positioned on the second end of the first side. The radar unit may also include a metallic cover coupled to the first side of the radiating plate such that the metallic cover and the radiating plate form a plurality of waveguide structures. As such, in order to transmit radar signals into the environment, the waveguide horn may be configured to receive, from an external source, electromagnetic energy provided through the waveguide opening via a first waveguide and provide a portion of the electromagnetic energy to the illuminator via a second waveguide such that the portion of the electromagnetic energy radiates off the illuminator and through a radiating sleeve into the environment as the radar signals. The first waveguide may extend parallel to a baseline of the radiating plate.

In some embodiments, the metallic cover is flat and the illuminator, the waveguide horn, the waveguide opening, and the radiating sleeve are etched a threshold depth into the radiating plate. In addition, in some examples, the radar unit may also include a second radiating plate having a first side and a second side with the first side of the second radiating plate having a second illuminator, a second waveguide horn, a second waveguide opening, and a second radiating sleeve that extend into the first side of the second radiating plate. For instance, the first side of the second radiating plate can be coupled to the second side of the radiating plate such that the radiating plate and the second radiating plate form a second plurality of waveguide structures.

In further embodiments, the illuminator includes an arc-shape having a degree of curvature that is configured to reduce a sidelobe level of radar signals transmitted via the radar unit. For instance, the degree of curvature of the illuminator can be based on a focus point of the waveguide horn such that radar signals transmitted by the radar unit have a fan-shaped beam that includes a plus/minus 2.5 degrees on an elevation plane. In addition, the waveguide horn may include a fray opening and the external source may be a PCB configured to supply electromagnetic energy.

At block 704, method 700 involves receiving, using the radar unit, reflections corresponding to the radar signal from the environment. In some examples, receiving reflections may involve receiving the reflections at the radar unit such that the reflections traverse through the radiating sleeve toward the illuminator, reflect off the illuminator and into the waveguide horn, and traverse, via the first waveguide, through the waveguide opening and to an external source.

At block 706, method 700 involves processing the reflections to detect one or more objects in the environment. For example, a processing unit (e.g., computing device 300 shown in FIG. 3) may receive radar reflections from the radar unit and other radar units for processing, which may involve performing a fusion process to determine a 2D map of the environment that indicates information corresponding to objects in the environment around the radar system (e.g., surrounding around a vehicle). In some examples, method 700 may further involve controlling a vehicle based on the one or more objects in the environment.

Figure 8:
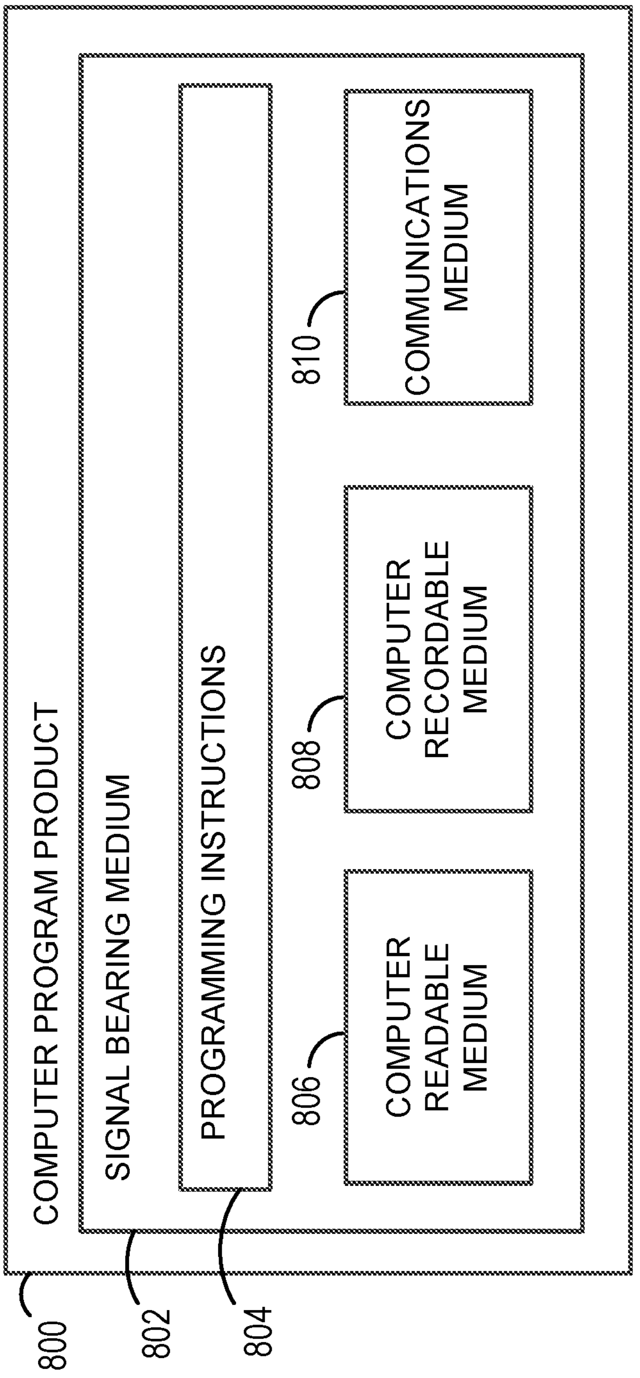
FIG. 8 is a schematic diagram of a computer program, according to example implementations.

FIG. 8 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 800 is provided using signal bearing medium 802, which may include one or more programming instructions 804 that, when executed by one or more processors may provide functionality or portions of the functionality described above with respect to FIGS. 1-7. In some examples, the signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, the signal bearing medium 802 may encompass a computer recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing device such as the computer system 112 of FIG. 1 may be configured to provide various operations, functions, or actions in response to the programming instructions 804 conveyed to the computer system 112 by one or more of the computer readable medium 806, the computer recordable medium 808, and/or the communications medium 810. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A radar unit comprising:

a radiating plate comprising an illuminator, a waveguide horn, a waveguide opening, and a radiating sleeve that are formed into a first side of the radiating plate; and a metallic cover coupled to the first side of the radiating plate to form a plurality of waveguide structures and enclose the illuminator and the waveguide horn, wherein the plurality of waveguide structures includes a first waveguide that connects the waveguide horn to the waveguide opening, wherein the waveguide horn is oriented at an acute angle relative to the first waveguide, wherein the illuminator has an arc-shape with a concave surface oriented toward the radiating sleeve and an end opening of the waveguide horn, wherein the waveguide horn is configured to receive electromagnetic energy from the first waveguide and direct the electromagnetic energy out through the end opening of the waveguide horn in a first direction toward the concave surface of the illuminator, wherein the electromagnetic energy traverses a direct path between the opening of the waveguide horn and the concave surface of the illuminator, and wherein the concave surface of the illuminator reflects the electromagnetic energy such that the electromagnetic energy radiates in a second direction through the radiating sleeve into an environment of the radar unit as one or more radar signals.

2. The radar unit of claim 1, wherein the illuminator has a degree of curvature that is configured to reduce a side lobe level of radar signals transmitted via the radar unit.

3. The radar unit of claim 2, wherein the degree of curvature is based on a focus point of the waveguide horn.

4. The radar unit of claim 1, wherein the waveguide horn is further configured to:

receive reflections corresponding to the one or more radar signals from the environment, wherein the reflections traverse in through the radiating sleeve and toward the illuminator before reflecting off the illuminator and into the waveguide horn via the end opening of the waveguide horn.

5. The radar unit of claim 1, wherein the waveguide horn includes a fray opening.

6. The radar unit of claim 1, wherein a top portion of the illuminator includes a straight section that extends in parallel to a base of the radiating plate.

7. The radar unit of claim 1, wherein the waveguide opening is coupled to a printed circuit board (PCB) configured to supply the electromagnetic energy.

8. The radar unit of claim 1, wherein the metallic cover is flat, and where the illuminator, the waveguide horn, the waveguide opening, and the radiating sleeve are etched a threshold depth into the radiating plate.

9. The radar unit of claim 1, further comprising:

a second radiating plate having a first side and a second side, wherein the first side of the second radiating plate includes a second illuminator, a second waveguide horn, a second waveguide opening, and a second radiating sleeve that extend into the first side of the second radiating plate, and wherein the first side of the second radiating plate is coupled to the second side of the radiating plate to form a second plurality of waveguide structures.

10. The radar unit of claim 9, wherein the second waveguide horn is configured to:

receive reflections corresponding to the one or more radar signals from the environment, wherein the reflections traverse in through the second radiating sleeve toward the second illuminator before reflecting off the second illuminator and into the second waveguide horn that is coupled to an external source.

11. A vehicle radar system comprising:

a plurality of radar units coupled to a vehicle and configured to use radar signals to measure an environment of the vehicle, wherein at least one radar unit from the plurality of radar units comprises:

a radiating plate comprising an illuminator, a waveguide horn, a waveguide opening, and a radiating sleeve that are formed into a first side of the radiating plate; and a metallic cover coupled to the first side of the radiating plate to form a plurality of waveguide structures and enclose the illuminator and the waveguide horn, wherein the plurality of waveguide structures includes a first waveguide that connects the waveguide horn to the waveguide opening, wherein the waveguide horn is oriented at an acute angle relative to the first waveguide, wherein the illuminator has an arc-shape with a concave surface oriented toward the radiating sleeve and an end opening of the waveguide horn, wherein the waveguide horn is configured to receive electromagnetic energy from the first waveguide and direct the electromagnetic energy out through the end opening of the waveguide horn and in a first direction toward the concave surface of the illuminator, wherein the electromagnetic energy traverses a direct path between the opening of the waveguide horn and the concave surface of the illuminator, and wherein the concave surface of the illuminator reflects the electromagnetic energy such that the electromagnetic energy radiates in a second direction through the radiating sleeve into an environment of the radar unit as one or more radar signals.

12. The vehicle radar system of claim 11, wherein the waveguide horn is further configured to:

receive reflections corresponding to the one or more radar signals from the environment, wherein the reflections traverse in through the radiating sleeve and toward the illuminator before reflecting off the illuminator and into the waveguide horn via the end opening of the waveguide horn, wherein the waveguide horn is coupled to a processor.

13. The vehicle radar system of claim 12, wherein the processor is configured to:

receive the reflections from the at least one radar unit;

receive a plurality of reflections corresponding to respective radar signals transmitted by one or more additional radar units from the vehicle radar system;

perform a fusion process using the reflections from the at least one radar unit and the plurality of reflections corresponding to respective radar signals transmitted by one or more additional radar units; and determine a two dimensional (2D) map of the environment based on the fusion process, wherein the 2D map indicates information corresponding to one or more objects in the environment.

14. The vehicle radar system of claim 11, wherein the illuminator has a degree of curvature that is configured to reduce a side lobe level of radar signals transmitted via the radar unit.

15. The vehicle radar system of claim 14, wherein the degree of curvature is based on a focus point of the waveguide horn such that the one or more radar signals have a fan-shaped beam that includes a plus/minus 2.5 degrees on an elevation plane.

16. The vehicle radar system of claim 11, wherein the plurality of radar units coupled to the vehicle further comprises:

a second radar unit comprising:

a plurality of radiating plates, wherein each radiating plate includes a given illuminator, a given waveguide horn, a given waveguide opening, and a given radiating sleeve that extend into a given side of the radiating plate, wherein the plurality of radiating plates are coupled together such that pairs of consecutive radiating plates form respective waveguides for transmission and reception of electromagnetic energy using respective illuminators, waveguide horns, waveguide openings, and radiating sleeves corresponding to the plurality of radiating plates; and a given metallic cover coupled to a first radiating plate from the plurality of radiating plates.

17. A method of operating a radar unit comprising:

transmitting, using the radar unit, a plurality of radar signals into an environment, wherein the radar unit comprises:

a radiating plate comprising an illuminator, a waveguide horn, a waveguide opening, and a radiating sleeve that are formed into a first side of the radiating plate; and a metallic cover coupled to the first side of the radiating plate to form a plurality of waveguide structures and enclose the illuminator and the waveguide horn, wherein the plurality of waveguide structures includes a first waveguide that connects the waveguide horn to the waveguide opening, wherein the waveguide horn is oriented at an acute angle relative to the first waveguide, wherein the illuminator has an arc-shape with a concave surface oriented toward the radiating sleeve and an end opening of the waveguide horn, and wherein the waveguide horn is configured to receive electromagnetic energy from the first waveguide and direct the electromagnetic energy out through the end opening of the waveguide horn and in a first direction toward the concave surface of the illuminator, wherein the electromagnetic energy traverses a direct path between the opening of the waveguide horn and the concave surface of the illuminator, and wherein the concave surface of the illuminator reflects the electromagnetic energy such that the electromagnetic energy radiates in a second direction through the radiating sleeve into an environment of the radar unit as one or more radar signals;

receiving, using the radar unit, reflections corresponding to the plurality of radar signals from the environment; and processing the reflections to detect one or more objects in the environment.

18. The method of claim 17, wherein receiving reflections corresponding to the plurality of radar signals from the environment comprises:

receiving the reflections at the radar unit, wherein the reflections traverse in through the radiating sleeve and toward the illuminator before reflecting off the illuminator and into the waveguide horn via the end opening of the waveguide horn, wherein the waveguide horn is coupled to a processor.

19. The method of claim 18, wherein processing the reflections to detect one or more objects in the environment comprises:

determining a two dimensional (2D) map of the environment, wherein the 2D map indicates information corresponding to the one or more objects in the environment.

20. The method of claim 1, wherein a degree of the acute angle depends on a desired radiation pattern for the one or more radar signals.

* * * * *